United States Patent
Avar et al.

(10) Patent No.: US 8,277,689 B2
(45) Date of Patent: Oct. 2, 2012

(54) STABILIZER COMPOSITION FOR IMPROVED PROTECTION AGAINST DEGRADATION OF ORGANIC SUBSTRATES BY LIGHT

(75) Inventors: Lajos Avar, Biel-Benken (CH); Christoph Kroehnke, Breisach-Oberrimsingen (DE)

(73) Assignee: Clariant Finance (BVI) Limited, Tortola (BV)

( * ) Notice: Subject to any disclaimer, the term of this patent is extended or adjusted under 35 U.S.C. 154(b) by 657 days.

(21) Appl. No.: 12/438,190

(22) PCT Filed: Aug. 27, 2007

(86) PCT No.: PCT/EP2007/058855
§ 371 (c)(1),
(2), (4) Date: Feb. 20, 2009

(87) PCT Pub. No.: WO2008/025738
PCT Pub. Date: Mar. 6, 2008

(65) Prior Publication Data
US 2009/0194743 A1    Aug. 6, 2009

(30) Foreign Application Priority Data
Sep. 1, 2006  (EP) .................................. 06291401

(51) Int. Cl.
*C09K 15/16* (2006.01)
*C08K 5/00* (2006.01)

(52) U.S. Cl. .................. 252/405; 252/182.29; 252/401; 252/403; 252/589; 524/91; 524/99

(58) Field of Classification Search .................. 252/403, 252/182.29, 401, 404, 399, 405, 589; 524/306, 524/91, 99; 548/259; 428/457
See application file for complete search history.

(56) References Cited

U.S. PATENT DOCUMENTS 3,634,320 A      1/1972  Metzner et al.
2009/0116115 A1*  5/2009  Kogure et al. ................. 359/599

FOREIGN PATENT DOCUMENTS

| DE | 1801221 | 5/1970 |
| WO | WO 03/016292 | 2/2003 |
| WO | WO 03/095543 | 11/2003 |
| WO | WO2005/118562 A1 * | 12/2005 |

OTHER PUBLICATIONS

PCT International Search Report for PCT/EP2007/058855, mailed Nov. 10, 2007.
PCT Written Opinion of the International Searching Authority for PCT/EP2007/058855, mailed Nov. 10, 2007.
H. Zweifel, "Plastic Additives Handbook", Hanser Publishing Munic, Germany (2001) and Hanser Gardener Publications, Cincinnati USA, Chapter 1.5.1.2., pp. 11-13 (2000).

* cited by examiner

*Primary Examiner* — Bijan Ahvazi
(74) *Attorney, Agent, or Firm* — Anthony A. Bisulca

(57) ABSTRACT

The invention relates to combinations of benzylidene-bismalonate based lightsstabilizers with specific other additives showing synergistic efficiency during long term light exposure of organic substrates.

14 Claims, No Drawings

STABILIZER COMPOSITION FOR IMPROVED PROTECTION AGAINST DEGRADATION OF ORGANIC SUBSTRATES BY LIGHT

The invention relates to combinations of benzylidene-bis-malonate based light stabilizers with specific other additives showing synergistic efficiency during long term light exposure of organic substrates.

As known in the art many organic substrates, particularly polymeric substrates or polymeric materials, require a stabilization package usually composed of sterically hindered amines (HAS) and often combined with UV absorbers, to maintain the polymer properties in spite of long term light exposure during their lifetime.

Polymeric substrates or polymeric materials, primarily those of an "organic" nature, are susceptible to degradation from high energy radiation. Ultraviolet (UV) radiation from sunlight is the most common initiator of polymeric photo-oxidation.

UV light when absorbed by organic polymer systems generates "free-radicals." These free-radicals (peroxides and molecular fragments with an unpaired electron) cause the exposed material to degrade via various oxidation reactions resulting in color change and loss of physical and chemical properties.

Basically two main classes of additives are commonly used for efficient photo stabilization of organic polymers such as plastics, elastomer-modified plastics, fibres and coatings: UV absorbers and photo-antioxidants of the hindered amine stabilizers (HAS) type. The additives interfere with chemical and physical processes induced by solar and artificial radiation. Structures of photo stabilizers have to be adjusted to a particular polymer and environmental conditions of its application.

The UV absorbers, sometimes also referred to as UV light stabilizers, are a still growing class of compounds. These compounds act as interceptors to ultraviolet light absorbing, as it attacks and prevent it from starting the destabilizing reactions which can damage cells and destroy plastics. By adding UV absorbers to these products a significantly prolonged useful lifetime can be achieved.

The practical approaches to prevent or at least retard photo-oxidative degradation in susceptible polymeric systems are:

a) Reduction of the absorption of UV light by the matrix of the organic substrate b) Reduction of the light induced energy absorbed by adding certain molecular groups in the polymer ("quenching")

c) Antioxidant action

Reducing the absorption of UV light by the polymeric matrix can be achieved by the "blocking" of UV absorption using various UV opaque pigments or by employing UV absorbers which selectively absorb the harmful radiation and re-emit it in a less harmful wavelength, mainly as heat.

Commercially known UV-absorbers are o-hydroxy-benzophenones or o-hydroxyphenyl-benzotriazoles or benzoates, cinnamates, oxanilides or salicylates. Most hindered amine stabilizers are the well known derivatives of amino-tetra-alkyl-piperidines.

All these compounds are described e.g. in the "Plastics Additives Handbook", 5$^{th}$ edition, editor H. Zweifel, Hanser Publishers Munic, Germany (2001) and Hanser Gardener Publications, Cincinnati, USA (2000), chapter 1.5.1.2, pp. 11-13.

Often both UV-opaque pigments and UV absorbers are used jointly for maximum protection. However, because of esthetics and other considerations, many times UV-opaque pigments cannot be used.

Commercially, the main usage of UV absorbers is split between "benzophenones" (alpha hydroxy benzophenones), "benzotriazoles" (alpha hydroxy benzotriazoles) and hydroxyphenyltriazines. To a lesser extent compounds such as benzoates, cinnamates, oxanilides, and salicylates are used.

UV absorbers having inherent photo stability in the 290-400 nm wavelength regime are used for protection of polymers against their photo degradation. UV-absorbers with hydroxyphenyl groups act usually by intramolecular proton transfer mechanism taking place in the excited state.

Commodity and engineering polymers are not per se considered as photostable materials. Catalytic impurities such as residues of polymerization catalysts and traces of accidental metallic contaminants and sensitizers, also some pigments, are candidates to trigger photo degradation by atmospheric aging. Moreover, some transformation products of phenols may trigger photo oxidation. Stabilization of polymers exposed to actinic solar radiation is therefore mandatory.

In practice, various types of additives used are in combinations for UV protection. Combinations of additives have to be miscible in the polymeric matrix and have to show minimal migration out of the polymeric matrix. Also other side effects like nucleation have to be minimal in order to maintain the general physical properties of the organic substrate. Furthermore the additives have to be as efficient as possible in order to use as low concentrations as possible.

DE 1 801 221 discloses benzylidene-bis-malonates, methods for the production, and their application as UV absorbers in polymer substrates.

WO 03/095543 A discloses the use of benzylidene-bis-malonates particularly in combination with oxanilides and certain hindered amines stabilizers as well as phosphorous based processing stabilizers for the protection of various polymeric substrates against damaging influences during lifetime.

Unfortunately the known stabilizer combinations available on the market still show deficiencies with regard to the protection of organic substrates against damaging influences of the environment, such as light and heat.

There is a still a need for more efficient additive formulations allowing dosages at the commonly accepted concentration or even below.

Surprisingly it has now been found that mixtures of the UV absorbers based on benzylidene-bis-malonates with specific UV absorbers show synergistic effects in protecting organic substrates against the damaging influences during their lifetime.

In the following text, "heteroaryl" means a heteroaryl with 1, 2 or 3 heteroatoms, preferably 1 or 2, more preferably 1 heteroatom selected from the group consisting of O, N and S; if not otherwise stated.

Subject of the invention is a composition (C) comprising two UV absorbers as a component (A) and a component (B), the component (A) being one or more compounds of formula (I);

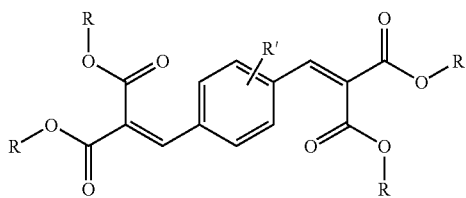

and
the component (B) being one or more compounds selected from the group consisting of compounds of formula (II),

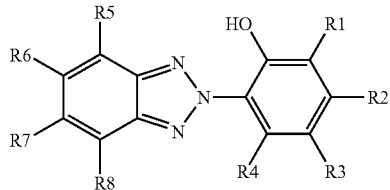

compounds of formula (V)

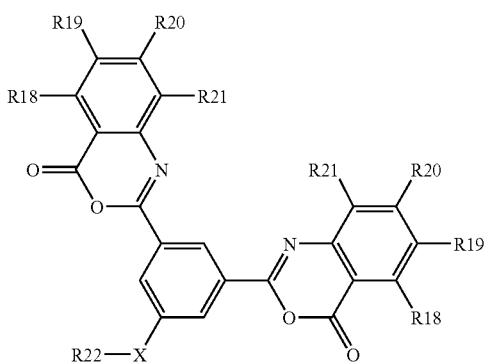

and
compounds of formula (VI);

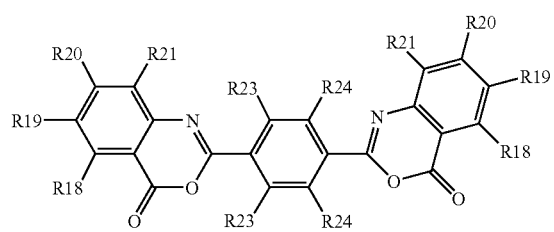

wherein
R is $C_{1-18}$ alkyl or $C_{1-18}$ cycloalkyl;
R' is selected from the group consisting of H, $C_{1-18}$ alkyl or $C_{3-12}$ cycloalkyl, $C_{6-10}$ aryl, F, Cl, Br, CN, OH, O—$C_{1-18}$ alkyl, O—$C_{3-12}$ cycloalkyl, O—$C_{6-10}$ aryl and $C_{3-10}$ heteroaryl with 1, 2 or 3 heteroatoms, preferably 1 or 2, more preferably 1 heteroatom selected from the group consisting of O, N and S;
R1 to R8 and R18 to R24 independently from each other are selected from the group consisting of H, OH, F, Cl, Br, S—$C_{1-12}$ alkyl and S—$C_{3-12}$ cycloalkyl, $C_{1-18}$ alkyl, $C_{3-12}$ cycloalkyl, $C_{6-10}$ aryl, $C_{3-10}$ heteroaryl with 1, 2 or 3 heteroatoms, preferably 1 or 1, more preferably 1 heteroatom selected from the group consisting of O, N or S;
C(O)O—$C_{6-10}$ aryl, C(O)O—$C_{3-10}$ heteroaryl with 1, 2 or 3 heteroatoms, preferably 1 or 2, more preferably 1 heteroatom selected from the group consisting of O, N or S;
O—$C_{1-18}$ alkyl, O—$C_{3-12}$ cycloalkyl, O—$C_{6-10}$ aryl, O—$C_{3-10}$ heteroaryl with 1, 2 or 3 heteroatoms, preferably 1 or 2, more preferably 1 heteroatom selected from the group consisting of O, N or S.

Preferred is a composition (C), wherein
R is $C_{1-6}$ alkyl;
R' is selected from the group consisting of H, $C_{1-6}$ alkyl and $C_{6-12}$ cycloalkyl;
R1 to R8 and R18 to R24 independently from each other are selected from the group consisting of H, $C_{1-12}$ alkyl, $C_{6-12}$ cycloalkyl, $C_6$ aryl, $C_{3-5}$ heteroaryl, C(O)O—$C_6$ aryl, C(O)O—$C_{3-5}$ heteroaryl, O—$C_{1-12}$ alkyl, O—$C_{3-10}$ cycloalkyl, O—$C_6$ aryl, O—$C_{3-5}$ heteroaryl and OH.

More preferred is a composition (C), wherein in formula (I)
R is $C_{1-2}$ alkyl and
R' is H;
preferably
R is ethyl and
R' is H.

Even more preferred is a composition (C) comprising two UV absorbers as a component (A) and a component (B),
the component (A) being one or more compounds of formula (I), and
the component (B) being one or more compounds of formula (II);
preferably with R being ethyl and R' being H in formula (I);
even more preferably with R being ethyl and R' being H in formula (I) and with R1 and R3 being tert-butyl, R2, R4, R5, R7 and R8 being H, and R6 being Cl in formula (II).

Further even more preferred is a composition (C) comprising two UV absorbers as a component (A) and a component (B),
the component (A) being one or more compounds of formula (I), and
the component (B) being one or more compounds of formula (V);
preferably with R being ethyl and R' being H in formula (I);
even more preferably with R being ethyl and R' being H in formula (I) and with R18 to R21 being H, X being O and R22 being $C_8H_{17}$ in formula (V); or
even more preferably with R being ethyl and R' being H in formula (I) and with R18 and R20 being H, R19 and R21 being Cl, X being O and R22 being $C_8H_{17}$ in formula (V).

Further even more preferred is a composition (C) comprising two UV absorbers as a component (A) and a component (B), the component (A) being one or more compounds of formula (I),
and
the component (B) being one or more compounds of formula (VI);
preferably with R being ethyl and R' being H in formula (I), even more preferably with R being ethyl and R' being H in formula (I) and with R18 to R21 and R23 and R24 being H in formula (VI).

In the following text, when component (A) and/or component (B) are mentioned, always all different and preferable embodiments of component (A) or component (B) are meant as well.

In the composition (C), the weight ratio of the total amount of component (A) to the total amount of component (B) is of from between 1 to 19 and 19 to 1, preferably of from between 1 to 5 and 5 to 1, more preferably of from between 1 to 3 and 3 to 1.

The composition (C) can contain only component (A) and component (B), but additionally also one or more further substances can be present in the composition (C), preferably the further substances are antioxidants known to protect against damaging influences of oxygen during processing of organic polymers in the melt and during the lifetime of an organic material or organic substrate in the solid state.

Further preferred further substances, which can be present in the composition (C), are organophosphites, organophosphonites, sterically hindered phenols, sterically hindered amines (HAS) salts of fatty acids such as calciumstearate and further so called "co-stabilizers" e.g. metal oxides, carbonates, and lactates but also compounds like dihydrotalcite (DHT) which are used to neutralize residues of acids ("acid scavengers", "acid acceptors", "antiacids").

In the case, that the composition (C) additionally comprises only the described further substances and no polymers, it is called "additive composition" in this application.

The composition (C) can also be a masterbatch, i.e. comprising a component (A), a component (B) and a carrier substrate; in this case it is called "masterbatch composition" in this application; therefore another preferred embodiment of the invention is a masterbatch comprising the component (A) and the component (B). The carrier substrate can be any substrate conventionally used in masterbatches.

The additive compositions and the masterbatch compositions are used for the stabilization of organic substrates, preferably for stabilization of organic polymers. Therefore another subject of the invention is the use of a composition (C) for the stabilization of organic substrates or organic materials, preferably for the stabilization of organic substrates or organic materials against the damaging influence of light; and a further subject of the invention is a method for stabilizing an organic substrate comprising the step of adding component (A) and component (B), or a composition (C) comprising component (A) and component (B), to the organic substrate.

Therefore another subject of the invention is a composition (C) comprising a component (A), a component (B) and as a further substance an organic substrate, preferably an organic polymer; which is called "organic substrate composition" or "stabilized organic substrate" in this application, and is manufactured by adding component (A) and component (B), or a composition (C) comprising component (A) and component (B), to an organic substrate.

Preferred organic substrates are organic polymers, more preferably polar technical polymers, which are known in the literature under the expression "engineering plastics", even more preferably polymers which consist of linear or grafted copolymers.

Examples of organic polymers are:
Polymers of monoolefins and diolefins, for example polypropylene, polyisobutylene, polybut-1-ene, poly-4-methylpent-1-ene, polyisoprene or polybutadiene, as well as polymers of cycloolefins, for example of cyclopentene or norbornene; furthermore polyethylene (which optionally can be crosslinked); for example, high density polyethylene (HDPE), polyethylene of high density and high molar mass (HDPE-HMW), polyethylene of high density and ultrahigh molar mass (HDPE-UHMW), medium density polyethylene (HMDPE), low density polyethylene (LDPE), linear low density polyethylene (LLDPE), branched low density polyethylene (BLDPE).

Polyolefins, i.e. polymers of monoolefins exemplified in the preceding paragraph, in particular polyethylene and polypropylene, can be prepared by various, and especially by the following, methods:
a) free-radical polymerization (normally under high pressure and at elevated temperature)
b) catalytic polymerization using a catalyst that normally contains one or more metals of group IVb, Vb, VIb or VIII of the Periodic Table. These metals usually have one or more ligands, such as oxides, halides, alcoholates, esters, ethers, amines, alkyls, alkenyls and/or aryls that may be either π- or σ-coordinated. These metal complexes may be in the free form or fixed on substrates, for example on activated magnesium chloride, titanium(III) chloride, alumina or silicon oxide. These catalysts may be soluble or insoluble in the polymerization medium. The catalysts can be active as such in the polymerization or further activators may be used, for example metal alkyls, metal hydrides, metal alkyl halides, metal alkyl oxides or metal alkyloxanes, the metals being elements of groups Ia, IIa and/or IIIa of the Periodic Table. The activators may be modified, for example, with further ester, ether, amine or silyl ether groups. These catalyst systems are usually termed Phillips, Standard Oil Indiana, Ziegler (-Natta), TNZ (DuPont), metallocene or single site catalysts (SSC).

Mixtures of the polymers mentioned under 1), for example mixtures of polypropylene with polyisobutylene, polyethylene with polyisobutylene, polypropylene with polyethylene (for example PP/HDPE/LDPE) and mixtures of different types of polyethylene (for example LDPE/HDPE) with one another.

Copolymers of monoolefins and diolefins with each other or with other vinyl monomers, for example ethylene-propylene copolymers, linear low density polyethylene (LLDPE) and mixtures thereof with low density polyethylene (LDPE), propylene-but-1-ene copolymers, propylene-isobutylene copolymers, ethylene-but-1-ene copolymers, ethylene-hexene copolymers, ethylene-methylpentene copolymers, ethylene-heptene copolymers, ethylene-octene copolymers, propylene-butadiene copolymers, isobutylene-isoprene copolymers, ethylenealkyl acrylate copolymers, ethylenealkyl methacrylate copolymers, ethylene-vinyl acetate copolymers and their copolymers with carbon monoxide or ethylene-acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned under 1), for example polypropylene-ethylene-propylene copolymers, LDPE-ethylene-vinyl acetate copolymers, LDPEethylene-acrylic acid copolymers, LLDPE-ethylene-vinyl acetate copolymers, LLDPE-ethylene-acrylic acid copolymers and alternating or random polyalkylene-carbon monoxide copolymers and mixtures thereof with other polymers, for example polyamides.

Polymers derived from unsaturated alcohols and amines or the acyl derivatives or acetals thereof, such as polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in section 1.

Polyacetals such as polyoxymethylene and those polyoxymethylenes which contain comonomers, for example ethylene oxide; polyacetals modified with thermoplastic polyurethanes, acrylates or MBS.

Polyphenylene oxides and sulfides, and mixtures thereof with styrene polymers or polyamides.

Polyamides and copolyamides derived from diamines and dicarboxylic acids and/or from aminocarboxylic acids or the corresponding lactams, such as polyamide 4, 6, 6/6, 6/10, 6/9, 6/12, 4/6, 12/12, 11 and 12, aromatic polyamides starting from m-xylene, diamine and adipic acid; polyamides prepared from hexamethylenediamine and isophthalic and/or terephthalic acid and with or without an elastomer as modifier, for example poly-2,4,4-trimethylhexamethylene terephthalamide or poly-m-phenylene isophthalamide. Block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol. As well as polyamides or copolyamides modified with EPDM or ABS; and polyamides condensed during processing (RIM polyamide systems).

Polyureas, polyimides, polyamide-imides, polyether imides, polyester amides, polyhydantoins and polybenzimidazoles.

Polyesters derived from dicarboxylic acids and dialcohols and/or from hydroxycarboxylic acids or the corresponding lactones, such as polyethylene terephthalate, polybutylene terephthalate, poly-1,4-dimethylolcyclohexane terephthalate, polyhydroxybenzoates, as well as block polyether esters derived from hydroxyl-terminated polyethers; and also polyesters modified with polycarbonates or MBS.

Polycarbonates and polyester carbonates.

Polysulfones, polyether sulfones and polyether ketones.

Crosslinked polymers derived from aldehydes on the one hand and phenols, urea or melamine on the other hand, such as phenol/formaldehyde resins, urea/formaldehyde resins and melamine/formaldehyde resins.

Drying and non-drying alkyd resins.

Unsaturated polyester resins derived from copolyesters of saturated and unsaturated dicarboxylic acids with polyhydric alcohols and vinyl compounds as crosslinking agents, and also halogen-containing modifications thereof of low flammability.

Mixtures (polyblends) of the aforementioned polymers, for example PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/MBS, PPO/HIPS, PPO/PA 6.6 and copolymers, PA/HDPE, PA/PP, PA/PPO, PBT/ABS or PBT/PET/PC.

Natural and synthetic organic substances which constitute pure monomeric compounds or mixtures thereof, examples being mineral oils, animal or vegetable fats, oils and waxes, or oils, waxes and fats based on synthetic esters (e.g. phthalates, adipates, phosphates or trimellitates), and also blends of synthetic esters with mineral oils in any desired proportion by weight, as are employed, for example, as spin finishes, and aqueous emulsions thereof.

Preferred examples of organic polymers are:

ethylene-vinyl acetate copolymers and their copolymers with carbon monoxide or ethylene-acrylic acid copolymers and their salts (ionomers) as well as terpolymers of ethylene with propylene and a diene such as hexadiene, LDPE-ethylene-vinyl acetate copolymers, LDPE-ethylene-acrylic acid copolymers, LLDPE-ethylene-vinyl acetate copolymers, LLDPE-ethylene-acrylic acid copolymers and alternating or random polyalkylene-carbon monoxide copolymers and mixtures thereof with other polymers, for example polyamides.

Polymers derived from unsaturated alcohols and amines or the acyl derivatives or acetals thereof, such as polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins.

Polyacetals such as polyoxymethylene and those polyoxymethylenes which contain comonomers, for example ethylene oxide; polyacetals modified with thermoplastic polyurethanes.

Polyphenylene oxides and sulfides, and mixtures thereof with styrene polymers or polyamides.

Polyamides and copolyamides derived from diamines and dicarboxylic acids and/or from aminocarboxylic acids or the corresponding lactams, such as polyamide 4, 6, 6/6, 6/10, 6/9, 6/12, 4/6, 12/12, 11 and 12, aromatic polyamides starting from m-xylene, diamine and adipic acid; polyamides prepared from hexamethylenediamine and isophthalic and/or terephthalic acid and with or without an elastomer as modifier, for example poly-2,4,4-trimethylhexamethylene terephthalamide or poly-m-phenylene isophthalamide. Block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol. As well as polyamides or copolyamides.

Polyureas, polyimides, polyamide-imides, polyether imides, polyester amides, polyhydantoins and polybenzimidazoles.

Polyesters derived from dicarboxylic acids and dialcohols and/or from hydroxycarboxylic acids or the corresponding lactones, such as polyethylene terephthalate, polybutylene terephthalate, poly-1,4-dimethylolcyclohexane terephthalate, polyhydroxybenzoates, as well as block polyether esters derived from hydroxyl-terminated polyethers; and also polyesters modified with polycarbonates.

Polycarbonates and polyester carbonates.

Polysulfones, polyether sulfones and polyether ketones.

Crosslinked polymers derived from aldehydes on the one hand and phenols, urea or melamine on the other hand, such as phenol/formaldehyde resins, urea/formaldehyde resins and melamine/formaldehyde resins.

Drying and non-drying alkyd resins.

Unsaturated polyester resins derived from copolyesters of saturated and unsaturated dicarboxylic acids with polyhydric alcohols and vinyl compounds as crosslinking agents, and also halogen-containing modifications thereof of low flammability.

Mixtures (polyblends) of the aforementioned polymers, for example PP/EPDM, polyamide/EPDM, PVC/EVA, PC/PBT, PVC/CPE, PC/thermoplastic PUR, PA/HDPE, PA/PP, PA/PPO, PBT/PET/PC.

Natural and synthetic organic substances which constitute pure monomeric compounds or mixtures thereof, examples being mineral oils, animal or vegetable fats, oils and waxes, or oils, waxes and fats based on synthetic esters (e.g. phthalates, adipates, phosphates or trimellitates), and also blends of synthetic esters with mineral oils in any desired proportion by weight, as are employed, for example, as spin finishes, and aqueous emulsions thereof.

Especially preferred organic polymers are ethylene-vinylacetate copolymers (EVA),
polycarbonates and polyesters;
in particular EVA;
further in particular polyethyleneterephthalate (PET);
and further in particular polybutyleneterephthalate (PBT).

The composition (C) is manufactured by physically combining the individual components, i.e. the component (A), the component (B) and optionally one or more organic substrates, if the composition (C) comprises an organic substrate. The organic substrate is preferably a further substance such as described or an organic polymer. The components of the composition (C) can be physically combined by any conventional blending or mixing method, in solid and/or in molten state. The composition (C) is preferably in the form of powders, granulates, pellets, prills, fluids and the like.

Preferably the additive compositions comprising component (A) and component (B) are manufactured by combining the individual components. This can be done by any conventional blending or mixing method, in solid and/or in molten state.

Preferably the masterbatch compositions comprising component (A) and component (B) are produced by conventional methods for producing masterbatches, preferably by mixing the individual components, including the carrier substrate of the masterbatch, to a blend, and, if necessary, extruding the blend. The mixing can be done by any conventional blending or mixing method, in solid and/or in molten state.

The stabilization of organic substrates by using component (A) and component (B), i.e. the manufacture of organic substrate compositions comprising a component (A), a component (B) and an organic substrate, preferably an organic polymer, is done by incorporation of a component (A) and of a component (B), or of a compositions (C), into the organic substrate. The incorporation can be done by any conventional method, preferably by mixing, blending, extrusion, dispersion or dissolving. In case the organic substrate is an organic polymer, the incorporation of component (A) and component (B) is preferably done by means of extrusion; in case the organic substrate is a low molecular weight organic material or soluble polymer, the mixing or incorporation is done by means of blending, dissolving or dispersion.

The composition (C) comprises preferably of from 0.001 to 100% by weight, based on the total weight of the composition (C), of the combined amounts of component (A) and component (B).

In case the composition (C) is a masterbatch composition, the composition (C) comprises preferably of from 5 to 80%, more preferably of from 7.5 to 50%, even more preferably of from 7.5 to 30% by weight, based on the total weight of the composition, of the combined amounts of component (A) and component (B).

In case the composition (C) is an additive composition, the composition (C) comprises preferably of from 5 to 90%, more preferably of from 10 to 80%, even more preferably of from 20 to 70% by weight, based on the total weight of the composition, of the combined amounts of component (A) and component (B).

The composition (C) can also consist only of component (A) and of component (B).

In case the composition (C) is a stabilized organic substrate, the composition (C) comprises preferably of from 0.001 to 5%, more preferably 0.01 to 4%, even more preferably 0.01 to 1% by weight, based on the total weight of the composition, of the combined amounts of component (A) and component (B).

The composition (C) may also contain other products such as known additives, necessary to maintain, improve or change the polymer properties of the polymer.

The composition (C) provides for an improved protection of organic substrates against degrading by environmental conditions. The composition (C) homogeneously incorporates into the organic substrate without additional measures and without loss of compatibility. The composition (C) reduces the yellowing of the organic substrates, especially of organic polymers, which is effected by light and heat, and it reduces the loss of transparency and the loss of gloss of organic substrates, especially of organic polymers.

It was unexpected, that the combinations of a specific selection of two UV absorbers, with one UV absorber being based on benzylidene-bis-malonates, and the other UV absorber being selected from specific UV absorbers being based on benzotriazole type compounds of formula (II) and benzoxazinone type compounds of formulae (V) or (VI), show non-linear effects and improved stabilization of organic substrates, especially of organic polymers.

EXAMPLES

Artificial weathering was carried out according to DIN 53387 in a Weather-O-Meter (producer Atlas) equipped with Xe lamps and internal as well as external filters based on borosilicate. In such instrument a light intensity of 0.47 W/m$^2$ at a wavelength of 340 nm is reached. The duration of an exposure cycle is defined to be 120 minutes including a dry period of 102 min at 50% relative humidity and a black panel temperature of 63° C., whereas the duration of the water spray on period is defined being 18 min at 95% relative humidity and a black panel temperature of 58° C.

Treatments by aging under artificial UV-irradiation have been carried out in order to study the influence of the various UV absorbers and UV absorber-combinations. For this reason UV-CON A treatment according to ASTM D 5208, cycle A has been used containing fluorescent lamps with light emission $\lambda \leq 340$ nm. The cycles are characterized by exposure for 20 hours at 50° C. without water condensation followed by a period of 4 hours at 40° C. with water condensation.

Technically important is the control of the yellowness index (YI) which means per definition a measure of the tendency of plastics to turn yellow upon long-term exposure to light. It is comprehensively described in the norm DIN 6167 ("Description of yellowness of near-white or near-colorless materials"). For the measurements spectrocolorimeter type Minolta CM 3500d has been used. The difference between the unexposed plaques and the exposed plaques is determined. Low values correspond to low yellowing.

An important physical and technical parameter is the transparency, which has to maintained during a long service time at a level as high as possible. The samples have been investigated before and after artificial UV-A-exposure. The transparency measurements took place according to "Standard Test Methods for Transparency of Plastic Sheeting", ASTM designation D 1746-96; current edition approved Aug. 10, 1996, published February 1997; originally published as D 1746-60. For the measurements a spectrophotometer, type Minolta CM 3500 D has been used at wavelength of 700 nm. The difference between the unexposed plaques and the exposed plaques is determined. High values correspond to high transparency.

Among other tests the physical evaluation of the artificially aged samples took place by gloss measurements which have been executed according to the rules of the "Standard Test Method for Specular Gloss of Plastic Films and Solid Plastics", ASTM designation D 2457-97. This method is under designation of ASTM Committee D-20 on Plastics and is the direct responsibility of Subcommittee D20.40 on Optical Properties. Current edition approved Jan. 10, 1997, published May 1997. The method describes procedures for the measurements of gloss of plastic films and solid plastics, both opaque and transparent, containing separate gloss angles. The instrument used was a gloss-meter type micro-TRI-gloss, producer Byk-Gardener. The difference between the unexposed plaques and the exposed plaques is determined. High values correspond to high gloss.

Besides impact of light, polymer samples comprising the components (A) and (B) have been exposed to heat. For this reason, plaques have been placed in a forced air draft oven (type Memmert) heated up to the individually given temperature. After frequent withdrawals the difference of the yellowness index to the initial value before heat treatment in the oven has been measured by means of spectrophotometer, type Minolta CM 3500 D.

The amounts of the additives in the examples are always given in % by weight, based on the weight of the total composition (additives with polymer), if not otherwise stated.

The additives used are:

| Component (A): | |
|---|---|
| Hostavin ® B-CAP: | Compound of formula (I) with R being ethyl and R' being H. |
| Component (B): | |
| Tinuvin ® 327: | Compound of formula (II) with R1 and R3 being tert-butyl, R2, R4, R5, R7 and R8 being H, R6 being Cl. |
| YT 35/03: | Compound of formula (V) with R18 to R21 being H, X being O, R22 being $C_8H_{17}$. |
| YT 48/03: | Compound of formula (V) with R18 and R20 being H, R19 and R21 being Cl, X being O, R22 being $C_8H_{17}$. |
| Cyasorb ® UV-3638: | Compound of formula (VI) with R18 to R21 and R23 and R24 being H. |

Effects on Injection Molded Polycarbonate

Example 1

100 parts of polycarbonate, type Lexan 141 (producer General Electric) have been dry blended with the additives shown in tables 1A, 1B, 1C and 2. Afterwards the individual mixtures have been pre-extruded in a single screw extruder (screw composition 1:3) applying 4 temperature zones (ramping mode) heated from 260° C. to 280° C. with a die width of 4 mm and a speed of rotation of 80 rpm. These pre-extruded formulations have been finally used to prepare plaques (dimensions 100×100×1 mm) by means of injection molding (IM machine type Arburg) at 280° C. with a pressure of 50 bars.

Tables 1A, 1B and 1C show results after artificial weathering. The combination gives unexpectedly nonlinear and better results with regard to gloss, transparency and color, depending on the exposition time.

TABLE 1A

Artificial Weathering (DIN 53387) of Polycarbonate plaques
Impact on gloss (60°)

| Exposure time hours | Hostavin ® B-CAP ® 0.1% | YT 35/03 0.1% | Hostavin ® B-CAP 0.05% + YT 35/03 0.05% |
|---|---|---|---|
| 0 | 163.5 | 174.4 | 179.8 |
| 50 | 161.7 | 164.4 | 167.5 |
| 100 | 159.4 | 159.3 | 168.1 |
| 150 | 156.6 | 167.5 | 169.6 |
| 200 | 160.3 | 171.6 | 174.9 |
| 300 | 161.2 | 169.6 | 177.8 |
| 400 | 156.9 | 163.1 | 165.8 |
| 500 | 161.1 | 166.9 | 169.8 |
| 600 | 157.9 | 161.5 | 163.5 |
| 700 | 160.7 | 166.2 | 165.8 |
| 800 | 157.1 | 159.8 | 162.5 |
| 900 | 154.1 | 157.5 | 160.0 |
| 1000 | 154.5 | 156.0 | 158.3 |
| 1200 | 141.2 | 146.0 | 146.1 |
| 1400 | 138.8 | 146.8 | 147.1 |

TABLE 1B

Artificial Weathering (DIN 53387) of Polycarbonate plaques
Impact on transparency

| Exposure time hours | Hostavin ® B-CAP 0.1% | YT 35/03 0.1% | Hostavin ® B-CAP 0.05% + YT 35/03 0.05% |
|---|---|---|---|
| 0 | 90.21 | 90.14 | 90.29 |
| 50 | 90.28 | 90.23 | 90.31 |
| 100 | 90.06 | 90.07 | 90.15 |
| 150 | 90.02 | 90.02 | 90.07 |
| 200 | 89.97 | 89.97 | 90.00 |
| 300 | 89.93 | 89.84 | 89.99 |
| 400 | 89.71 | 89.76 | 89.80 |
| 500 | 89.81 | 89.82 | 89.84 |
| 600 | 89.81 | 89.82 | 89.88 |
| 700 | 89.67 | 89.83 | 89.86 |
| 800 | 89.69 | 89.80 | 89.87 |
| 900 | 89.50 | 89.57 | 89.57 |
| 1000 | 89.54 | 89.55 | 89.58 |
| 1200 | 89.02 | 89.26 | 89.39 |
| 1400 | 87.81 | 88.64 | 89.02 |

TABLE 1C

Artificial Weathering (DIN 53387) of Polycarbonate plaques
impact on Yellowness (YI)

| Exposure time hours | Hostavin ® B-CAP 0.1% | YT 35/03 0.1% | Hostavin ® B-CAP 0.05% + YT 35/03 0.05% |
|---|---|---|---|
| 0 | 1.30 | 1.05 | 0.97 |
| 50 | 1.57 | 1.44 | 1.28 |

TABLE 1C-continued

Artificial Weathering (DIN 53387) of Polycarbonate plaques impact on Yellowness (YI)

| Exposure time hours | Hostavin ® B-CAP 0.1% | YT 35/03 0.1% | Hostavin ® B-CAP 0.05% + YT 35/03 0.05% |
|---|---|---|---|
| 100 | 1.86 | 1.79 | 1.67 |
| 150 | 2.20 | 2.08 | 1.96 |
| 200 | 2.52 | 2.53 | 2.23 |
| 300 | 3.24 | 3.05 | 2.83 |
| 400 | 3.88 | 3.73 | 3.58 |
| 500 | 4.75 | 4.65 | 4.41 |
| 600 | 5.72 | 5.58 | 5.24 |
| 700 | 6.49 | 6.37 | 5.97 |
| 800 | 7.61 | 7.39 | 7.11 |
| 900 | 9.01 | 8.68 | 8.44 |
| 1000 | 9.26 | 8.96 | 8.70 |
| 1200 | 10.45 | 9.86 | 9.87 |
| 1400 | 11.06 | 10.47 | 10.23 |

Similarly, by means of artificial UV-A exposure according to ASTM 5208 an advantage using a mixture of two UV absorbers according to the invention can be demonstrated, e.g. in terms of higher gloss values, results are given in Table 2.

TABLE 2

Artificial UV-A exposure (ASTM 5208) of Polycarbonate plaques Impact on gloss (85°)

| Exposure time hours | Hostavin ® B-CAP 0.1% | YT 35/03 0.1% | Hostavin ® B-CAP 0.05% + YT 35/03 0.05% |
|---|---|---|---|
| 0 | 100.7 | 100.6 | 100.8 |
| 50 | 101.7 | 99.8 | 104.5 |
| 100 | 100.4 | 98.8 | 104.1 |
| 150 | 96.7 | 99.1 | 104.2 |
| 200 | 100.7 | 101.3 | 105.3 |
| 300 | 101.6 | 100.2 | 103.0 |
| 450 | 102.0 | 101.3 | 102.1 |
| 600 | 101.8 | 103.7 | 103.6 |
| 750 | 100.9 | 103.2 | 103.1 |
| 850 | 101.7 | 105.5 | 106.0 |
| 1050 | 103.1 | 104.7 | 106.8 |
| 1250 | 102.6 | 104.7 | 106.9 |
| 1450 | 105.6 | 103.3 | 106.3 |

Effects on Injection Molded Polyethyleneterephthalate

Example 2

100 parts of polyethyleneterephthalate (PET), type Arnite D 04 300 Nature (producer DSM) have been dry blended with additives as shown in table 3. Afterwards the individual mixtures have been pre-extruded in a single screw extruder (screw composition 1:3) applying 5 temperature zones (ramping mode) heated from 275° C. to 285° C. with a die width of 2 mm and a speed of rotation of 80 rpm. These pre-extruded formulations have been finally used to prepare plaques (dimensions 100×100×1 mm) by means of injection molding (IM machine type Arburg) at 270° C. with a pressure of 30 bars.

Results shown in table 3 show with regard to gloss after long-term UV-A exposure an unexpected and non-linear advantage by using combinations of UV absorbers according to the invention.

| Exposure time hours | Hostavin ® B-CAP 0.25% | Cyasorb ® UV-3638 0.25% | Hostavin ® B-CAP 0.1% + Cyasorb ® UV-3638 0.15% |
|---|---|---|---|
| 0 | 145.3 | 137.6 | 140.4 |
| 50 | 150.2 | 140.6 | 144.0 |
| 900 | 117.9 | 119.8 | 126.4 |
| 1200 | 89.9 | 97.0 | 103.3 |
| 1500 | 92.2 | 103.9 | 104.2 |

Each formulation contains additionally 0.2 wt-% of the organophosphite Hostanox ® PAR 24 (commercial name) and 0.05 wt-% of the sterically hindered phenol Hostanox ® O 16 (commercial name) as base stabilization

Performance of Ethylene-Methacrylicacid Salt Copolymer During Long Term Exposure

Example 3

Ethylene-methacrylicacid salt copolymer (IOM) type Surlyn® 9810 (producer Dupont) has been dry blended together with the additives mentioned in table 4. Afterwards the individual mixtures have been pre-extruded in a single screw extruder (screw composition 1:3) at a temperature of 210° C. with a die width of 4 mm and a speed of rotation of 50 rpm. These pre-extruded formulations have been finally used to prepare plaques (dimensions 100×100×2 mm) by means of injection molding (IM machine type Arburg) at 240° C. with a pressure of 30 bars.

Table 4 summarizes the results. In comparison to the formulations, where only one light stabilizer is present, the formulations with the inventive combinations of components (A) and (B) show an unexpected and non-linear improved performance in the sense of a less pronounced discoloration in comparison to the single component formulations.

TABLE 4

Influence of light stabilizers on color of ethylene-methacrylicacid salt copolymer type Surlyn ® 9810 during artificial weathering, carried out according to DIN

| Exposure time hours | Hostavin ® B-CAP 0.1% | Tinuvin ® 327 0.1% | Hostavin ® B-CAP 0.05% + Tinuvin ® 327 0.05% | YT 48/03 0.1% | Hostavin ® B-CAP 0.05% + YT 48/03 0.05% |
|---|---|---|---|---|---|
| 0 | 2.98 | 3.54 | 3.49 | 2.76 | 2.87 |
| 100 | 2.86 | 3.71 | 3.45 | 8.90 | 6.17 |
| 200 | 2.96 | 3.71 | 3.58 | 5.29 | 4.05 |
| 300 | 2.77 | 3.85 | 3.53 | 3.50 | 3.21 |
| 500 | 3.72 | 4.16 | 4.15 | 3.90 | 3.74 |
| 700 | 3.44 | 4.15 | 4.48 | 3.80 | 3.55 |

TABLE 4-continued

Influence of light stabilizers on color of ethylene-methacrylicacid salt copolymer type Surlyn ® 9810 during artificial weathering, carried out according to DIN

| Exposure time hours | Hostavin ® B-CAP 0.1% | Tinuvin ® 327 0.1% | Hostavin ® B-CAP 0.05% + Tinuvin ® 327 0.05% | YT 48/03 0.1% | Hostavin ® B-CAP 0.05% + YT 48/03 0.05% |
|---|---|---|---|---|---|
| 1000 | 4.50 | 4.29 | 4.22 | 4.56 | 2.83 |
| 1500 | 5.60 | 5.59 | 5.08 | 4.93 | 3.44 |

The invention claimed is:

1. A composition (C) comprising two UV absorbers as a component (A) and a component (B), the component (A) being one or more compounds of formula (I);

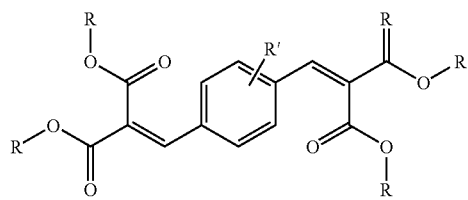

and
the component (B) being one or more compounds selected from the group consisting of
compounds of formula (II),

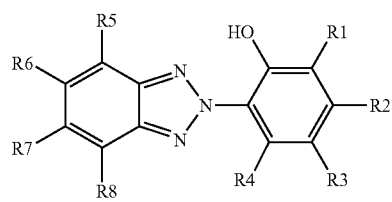

compounds of formula (V)

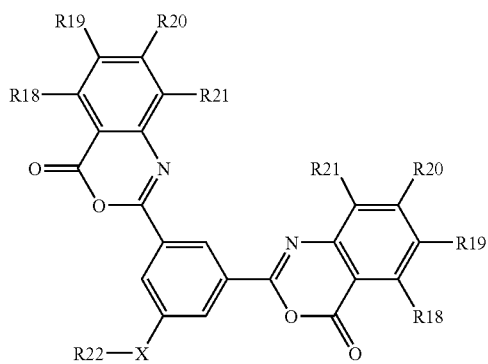

and
compounds of formula (VI);

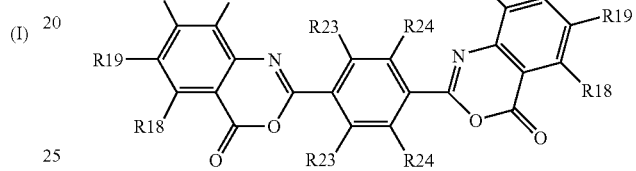

wherein
R is $C_{1-18}$ alkyl or $C_{1-18}$ cycloalkyl;
R' is selected from the group consisting of H, $C_{1-18}$ alkyl, $C_{3-12}$ cycloalkyl, $C_{6-10}$ aryl, F, Cl, Br, CN, OH, O—$C_{1-18}$ alkyl, O—$C_{3-12}$ cycloalkyl, O—$C_{6-10}$ aryl and $C_{3-10}$ heteroaryl with 1, 2 or 3 heteroatoms selected from the group consisting of O, N and S;
R1 to R8 and R18 to R24 independently from each other are selected from the group consisting of H, OH, F, Cl, Br, S-$C_{1-12}$ alkyl, S-$C_{3-12}$ cycloalkyl, $C_{1-18}$ alkyl, $C_{3-12}$ cycloalkyl, $C_{6-10}$ aryl, $C_{3-10}$ heteroaryl with 1, 2 or 3 heteroatoms selected from the group consisting of O, N and S;
C(O)O—$C_{6-10}$ aryl, C(O)O—$C_{3-10}$ heteroaryl with 1, 2 or 3 heteroatoms selected from the group consisting of O, N and S;
O—$C_{1-18}$ alkyl, O—$C_{3-12}$ cycloalkyl, O—$C_{6-10}$ aryl, and O—$C_{3-10}$ heteroaryl with 1, 2 or 3 heteroatoms selected from the group consisting of O, N and S and wherein X is O.

2. The composition (C) according to claim 1, wherein R is ethyl and R' is H.

3. A stabilized organic substrate comprising the component (A) and the component (B), with the component (A) and the component (B) being defined as in claim 2.

4. The stabilized organic substrate according to claim 3, wherein the organic substrate is an engineering plastic.

5. The composition (C) according to claim 1, wherein the component (A) is one or more compounds of formula (I), and the component (B) is one or more compounds of formula (II).

6. The composition (C) according to claim 1, wherein the component (A) is one or more compounds of formula (I), and the component (B) is one or more compounds of formula (V).

7. The composition (C) according to claim 1, wherein the component (A) is one or more compounds of formula (I), and the component (B) is one or more compounds of formula (VI).

8. The composition (C) according to claim 1, wherein the weight ratio of the total amount of the component (A) to the total amount of the component (B) is between 1 to 19 and 19 to 1.

9. The composition (C) according to claim 1, comprising of from 0.001 to 100% by weight, based on the total weight of the composition (C), of the combined amounts of component (A) and component (B).

10. The composition (C) according to claim 9, comprising from 5 to 90% by weight, based on the total weight of the composition (C), of the combined amounts of component (A) and component (B).

11. The composition (C) according to claim 9, comprising the component (A) and the component (B).

12. The composition (C) according to claim 9, comprising from 0.001 to 5% by weight, based on the total weight of the composition (C), of the combined amounts of component (A) and component (B).

13. A method for the manufacture of the composition (C) as defined in claim 1, comprising the step of mixing the component (A), the component (B) and optionally a further substance.

14. An organic substrate stabilizer comprising the composition (C) as defined in claim 1.

\* \* \* \* \*